United States Patent
Hwang

(10) Patent No.: US 9,348,456 B2
(45) Date of Patent: May 24, 2016

(54) DETERMINATION OF BEZEL AREA ON TOUCH SCREEN

(71) Applicant: KOREA ADVANCED INSTITUTE OF SCIENCE AND TECHNOLOGY, Daejeon (KR)

(72) Inventor: Sung Jae Hwang, Daejeon (KR)

(73) Assignee: KOREA ADVANCED INSTITUTE OF SCIENCE AND TECHNOLOGY (KR)

(*) Notice: Subject to any disclaimer, the term of this patent is extended or adjusted under 35 U.S.C. 154(b) by 129 days.

(21) Appl. No.: 14/156,680

(22) Filed: Jan. 16, 2014

(65) Prior Publication Data

US 2015/0002411 A1   Jan. 1, 2015

(30) Foreign Application Priority Data

Jun. 27, 2013   (KR) ..................... 10-2013-0074902

(51) Int. Cl.
*G06F 3/041* (2006.01)

(52) U.S. Cl.
CPC .............. *G06F 3/0416* (2013.01); *G06F 3/041* (2013.01)

(58) Field of Classification Search
CPC .......................... G06F 3/041; G06F 3/0416
See application file for complete search history.

(56) References Cited

U.S. PATENT DOCUMENTS

| | | | |
|---|---|---|---|
| 2009/0179865 A1 | 7/2009 | Kumar | |
| 2010/0156795 A1 | 6/2010 | Kim et al. | |
| 2011/0316807 A1 | 12/2011 | Corrion | |
| 2013/0222321 A1* | 8/2013 | Buening | 345/173 |
| 2013/0300668 A1* | 11/2013 | Churikov et al. | 345/168 |
| 2014/0009407 A1* | 1/2014 | Kim | 345/173 |

FOREIGN PATENT DOCUMENTS

| | | |
|---|---|---|
| KR | 1020050037245 | 4/2005 |
| KR | 1020060008774 | 1/2006 |
| KR | 1020090008748 | 1/2009 |
| KR | 1020110117772 | 10/2011 |
| KR | 1020130032598 | 4/2013 |

* cited by examiner

*Primary Examiner* — Charles Hicks
(74) *Attorney, Agent, or Firm* — Cantor Colburn LLP

(57) ABSTRACT

An end device may include a touch screen; a touch screen manager configured to: determine a first area and a second area on the touch screen, and determine at least one of a display property or a touch sensing property of the first area to be different from that of the second area; and a processor configured to: display an image on the first area and the second area.

17 Claims, 12 Drawing Sheets

DETERMINATION OF BEZEL AREA ON TOUCH SCREEN

CROSS-REFERENCE TO RELATED PATENT APPLICATION

This application claims priority from the Korean Patent Application No. 10-2013-0074902, filed on Jun. 27, 2013 in the Korean Intellectual Property Office, the entire disclosure of which is incorporated herein by reference in its entirety.

FIELD

Example embodiments broadly relate to a device having a bezel displayed on a touch screen.

BACKGROUND

Touch-sensitive displays (also known as "touch screens" or "touchscreens") are well known in the art. Touch screens may be used in many electronic devices to display graphics and text, and to provide a user interface through which a user may interact with the devices. Touch screens are becoming more popular for use as displays and as user input devices on portable devices, such as mobile telephones and personal digital assistants (PDAs).

SUMMARY

According to an aspect of example embodiments, there is provided an end device including a touch screen; a touch screen manager configured to: determine a first area and a second area on the touch screen, and determine at least one of a display property or a touch sensing property of the first area to be different from that of the second area; and a processor configured to: display an image on the first area and the second area.

The touch screen manager may further determine a size and/or a position of the first area, based at least in part on context information of the end device.

The end device may further include an input receiver configured to receive a touch input. Further, the touch screen manager may further determine a contour of the first area, based at least in part on the received touch input.

The context information may include at least one of a status of a battery coupled to the end device, a shape of a grip of a user on the touch screen, an orientation of the end device or an application hosted on the end device.

The touch sensing property may include at least one of a touch sensitivity of the first area, or turn on/off of touch sensors of the first area.

The display property may include at least one of a brightness, a resolution, a transparency, a visibility or a chroma of the first area.

The touch screen manager may further divide the first area into a plurality of sub-areas, and may respectively determine the display property of each of the plurality of sub-areas.

According to another aspect of example embodiments, there is provided a computer-readable storage medium having thereon computer-executable instructions that, in response to execution, cause one or more processors of an end device having a touch screen to perform operations including determining a first area and a second area on the touch screen; determining at least one of a display property or a touch sensing property of the first area to be different from that of the second area; and displaying an image on the first area and the second area.

The determining of the first area and the second area may include determining a size and/or a position of the first area based at least in part on context information of the end device.

The operations may further include receiving a touch input; and determining a contour of the first area, based at least in part on the received touch input.

The context information may include at least one of a status of a battery coupled to the end device, a shape of a grip of a user on the touch screen, an orientation of the end device or an application hosted on the end device.

The touch sensing property may include at least one of a touch sensitivity of the first area, or turn on/off of touch sensors of the first area.

The display property may include at least one of a brightness, a resolution, a transparency, a visibility or a chroma of the first area.

The determining of the display property of the first area may include: dividing the first area into a plurality of sub-areas, and respectively determining the display property of each of the plurality of sub-areas.

According to still another aspect of example embodiments, a method performed under control of an end device having a touch screen may include: determining a first area and a second area on the touch screen; determining at least one of a display property or a touch sensing property of the first area to be different from that of the second area; and displaying an image on the first area and the second area.

The determining of the first area and the second area may include determining a size and/or a position of the first area based at least in part on context information of the end device.

The method may further include: receiving a touch input; and determining a contour of the first area, based at least in part on the received touch input.

The context information may include at least one of a status of a battery coupled to the end device, a shape of a grip of a user on the touch screen, an orientation of the end device or an application hosted on the end device.

The touch sensing property may include at least one of a touch sensitivity of the first area, or turn on/off of touch sensors of the first area.

The display property may include at least one of a brightness, a resolution, a transparency, a visibility or a chroma of the first area.

BRIEF DESCRIPTION OF THE DRAWINGS

Non-limiting and non-exhaustive example embodiments will be described in conjunction with the accompanying drawings. Understanding that these drawings depict only example embodiments and are, therefore, not intended to limit its scope, the example embodiments will be described with specificity and detail taken in conjunction with the accompanying drawings, in which.

DETAILED DESCRIPTION

Figure 1:
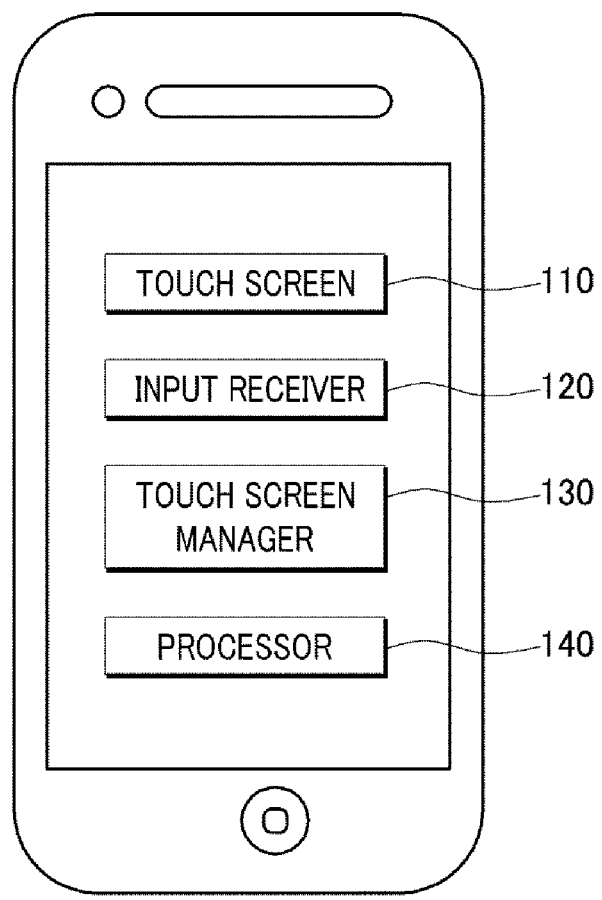
FIG. 1 schematically shows an example configuration of an end device in accordance with at least some embodiments described herein.

Hereinafter, some embodiments will be described in detail. It is to be understood that the following description is given only for the purpose of illustration and is not to be taken in a limiting sense. The scope of the invention is not intended to be limited by the embodiments described hereinafter with reference to the accompanying drawings, but is intended to be limited only by the appended claims and equivalents thereof.

It is also to be understood that in the following description of embodiments any direct connection or coupling between functional blocks, devices, components, circuit elements or other physical or functional units shown in the drawings or described herein could also be implemented by an indirect connection or coupling, i.e. a connection or coupling comprising one or more intervening elements. Furthermore, it should be appreciated that functional blocks or units shown in the drawings may be implemented as separate circuits in some embodiments, but may also be fully or partially implemented in a common circuit in other embodiments. In other words, the provision of functional blocks in the drawings is intended to give a clear understanding of the various functions performed, but is not to be construed as indicating that the corresponding functions are necessarily implemented in physically separate entities.

It is further to be understood that any connection which is described as being wire-based in the following specification may also be implemented as a wireless communication connection unless noted to the contrary.

The features of the various embodiments described herein may be combined with each other unless specifically noted otherwise. On the other hand, describing an embodiment with a plurality of features is not to be construed as indicating that all those features are necessary for practicing the present invention, as other embodiments may comprise less features and/or alternative features.

FIG. 1 schematically shows an example configuration of an end device 100 in accordance with at least some embodiments described herein. As depicted in FIG. 1, end device 100 may include a touch screen 110, an input receiver 120, a touch screen manager 130 and a processor 140. Although illustrated as discrete components, various components may be divided into additional components, combined into fewer components, or eliminated altogether while being contemplated within the scope of the disclosed subject matter. It will be understood by those skilled in the art that each function and/or operation of the components may be implemented, individually and/or collectively, by a wide range of hardware, software, firmware, or any combination thereof. In that regard, one or more of input receiver 120, touch screen manager 130 and processor 140 may be included in an instance of an application hosted on end device 100.

Non-limiting examples of end device 100 may include a smart phone, a smart television, a tablet computer, a phablet device, a mobile phone, or a personal communication terminal, such as PCS (Personal Communication System), GMS (Global System for Mobile communications), PDC (Personal Digital Cellular), PDA (Personal Digital Assistant), IMT (International Mobile Telecommunication)-2000, CDMA (Code Division Multiple Access)-2000, W-CDMA (W-Code Division Multiple Access) and Wibro (Wireless Broadband Internet) terminal.

Touch screen 110 may be configured to display a bezel area (sometimes, referred to as a first area) and a normal area (sometimes, referred to as a second area) on touch screen 110. As referenced herein, the bezel area may refer to an area that may have a display property and/or a touch sensing property different from that of the normal area even while displaying an image thereon. For example, but not as a limitation, the display property may refer to at least one of a brightness, a resolution, a transparency, a visibility or a chroma. Further, non-limiting examples of the touch sensing property may include at least one of a touch sensitivity or turn on/off of touch sensors formed under the bezel area. The bezel area may be positioned to surround the normal area or to be disposed at an edge of the normal area. Further, the normal area may refer to an area that may be configured to display an image thereon as like an ordinary display device. For example, touch screen 110 may have a touch-sensitive surface that receives a touch input. Touch screen 110 may be configured to receive the touch input to the touch-sensitive surface and converts the touch input into interaction with user-interface objects that are displayed on touch screen 120. By way of example, but not as a limitation, touch screen 110 may use liquid crystal display (LCD) technology, light emitting diode (LED) technology, organic light emitting diode (OLED) technology or light emitting polymer display (LPD) technology. Further, in some embodiments, end device 100 may include a flexible display or a flipable display instead of touch screen 110.

Input receiver 120 may be configured to receive and/or identify a touch input that may be generated by a user of end device 100 on touch screen 110. The user may make the touch input to touch screen 110 using any suitable object or appendage, such as a stylus, finger, and so forth.

Touch screen manager 130 may be configured to determine the bezel area and the normal area on touch screen 110. Specifically, touch screen manager 130 may be configured to determine sizes and/or positions of the bezel area and the normal area on touch screen 110, and to display the bezel area and the normal area based on the determined sizes and/or positions.

In some embodiments, touch screen manager 130 may be configured to determine a size and/or position of the bezel area, based on context information of end device 100. Non-limiting examples of the context information of end device 100 may include at least one of a status of a battery coupled to end device 100, a shape of a grip of a user on touch screen 110, an orientation of end device 100 or an application hosted on end device 100. Touch screen manager 130 may be configured to automatically change the size and/or position of the bezel area, based on context information of end device 100. For example, touch screen manager 130 may be configured to expand the bezel area in size, and resultingly to reduce the normal area in size, if an amount of power charged in the battery of end device 100 remains lower than a predetermined threshold value. For another example, end device 100 may be configured to pre-register and/or store, in a corresponding memory of end device 100, information in which plural kinds of applications executable on end device 100 and corresponding sizes or positions of the bezel area are matched. Touch screen manager 130 may be configured to further change a size and/or a position of the bezel area depending on a kind of an application hosted on end device 100, based on the pre-registered and/or stored information. For another example, touch screen manager 130 may be configured to recognize a touch area on touch screen 110 on which a finger or a grip of a user is contacted. Further, touch screen manager 130 may be configured to change a size and/or a position of the bezel area based on a shape or a size of the recognized touch area.

Further, in some embodiments, touch screen manager 130 may be configured to determine a size and/or position of the bezel area, based on an external input to end device 100. For example, but not as a limitation, the external input may be generated by a keyboard, a mouse or a eye tracking sensor which is operatively coupled to end device 100. For another example, touch screen manager 130 may be configured to determine the bezel area based on a folding or bending action of a user of end device 100. More specifically, an area which was folded or bent may be set to be the bezel area, when a user of end device 100 folds or bends touch screen 110. In this case, the bezel area may be positioned on touch screen 110 between at least two normal areas.

Touch screen manager 130 may be configured to determine a display property of the bezel area to be different from that of the normal area. For example, but not as a limitation, the display property of the bezel area may refer to at least one of a brightness, a resolution, a transparency, a visibility or a chroma of the bezel area. In some embodiments, touch screen manager 130 may be configured to determine the display property of the bezel area based, at least in part, on the context information of end device 100. For example, touch screen manager 130 may be configured to decrease a resolution of a part of an image displayed on the bezel area, if an amount of power charged in the battery of end device 100 remains lower than a predetermined threshold value. For another example, touch screen manager 130 may be configured to decrease a transparency of the bezel area, if a background image of an application, which is relatively inconsequential, is displayed on the bezel area.

Further, in some embodiments, touch screen manager 130 may be configured to divide the bezel area into multiple sub areas. Touch screen manager 130 may be further configured to determine and change the display property of each of the multiple sub areas respectively. So, in some embodiments, a gradation may be generated and displayed on the bezel area in association with a position, on touch screen 110, of each of the multiple sub areas. For example, but not as a limitation, the more a position of a sub area is distant from an edge of touch screen 110, the more the brightness of the sub area is increased. So, a gradation of brightness may be generated on the bezel area displayed on touch screen 110.

Touch screen manager 130 may be configured to determine a touch sensing property of the bezel area to be different from that of the normal area. For example, but not as a limitation, the touch sensing property of the bezel area may include at least one of a touch sensitivity of the bezel area, or turn on/off of touch sensors of the bezel area. In some embodiments, touch screen manager 130 may be configured to determine the touch sensing property of the bezel area based, at least in part, on the context information of end device 100. For example, touch screen manager 130 may be configured to increase or decrease a touch sensitivity of the bezel area, depending on a kind of an application hosted on end device 100. Touch screen manager 130 may be configured to increase the touch sensitivity of the bezel area, if an application which may need a relatively high touch sensitivity (e.g., a game application) is executed on end device 100. On the contrary, touch screen manager 130 may be configured to decrease the touch sensitivity of the bezel area, if an application which may need a relatively low touch sensitivity (e.g., a web browser) is executed on end device 100. For another example, touch screen manager 130 may be configured to turn off touch sensors formed under at least a portion of the bezel, if an image which does not require a touch interface/interaction is displayed on the bezel area and a hand or a finger of a user of end device 100 is touched to the bezel area.

In some embodiments, touch screen manager 130 may be configured to determine a contour of the bezel area, based, at least in part, on the touch input which is received by input receiver 120. For example, but not as a limitation, touch screen manager 130 may be configured to recognize a circular line which is drawn by a touch input that draws a circle on touch screen 110. Touch screen manager 130 may be configured to then change the contour of the bezel area (e.g., a boundary line between the bezel area and the normal area) according to the recognized circular line.

Further, touch screen manager 130 may be configured to determine the contour of the bezel area further based on the context information of end device 100. A user of end device 100 may generate a touch input to draw the contour of the bezel area, which has a variety of shapes, depending on kinds of applications hosed on end device 100. For example, a user of end device 100 may draw the contour of the bezel area so that a background image of an application may be displayed even on the bezel area. Since various applications having various background images are executed on end device 100, the contour of the bezel may also have various shapes. Touch screen manager 130 may be configured to recognize and/or identify a line which is drawn by the touch input on touch screen 110, and to set the recognized line to be the contour of the bezel area.

Processor 140 may be configured to display an image on both of the bezel area and the normal area. As a non-limiting example of the image displayed on the bezel area and the normal area may include a picture, a frame or a scene of video content, etc. End device 100 may receive the picture or the content from outside of end device 100 via a network. The network may be an interconnected structure of nodes, such as terminals and servers, and allows sharing of information among the nodes. Non-limiting examples of the network may include a wired network protocol, such as LAN (Local Area Network), WAN (Wide Area Network), VAN (Value Added Network), etc.; or various other wireless network protocols, such as a mobile radio communication network including at least one of a 3rd generation (3G) mobile telecommunications network, a 4th or 5th generation mobile telecommunications network, any other mobile telecommunications networks, a satellite network, WiBro (Wireless Broadband Internet), a Wi-Fi network, Mobile WiMAX, HSDPA (High Speed Downlink Packet Access) or the like.

Further, in some embodiments, processor 140 may be configured to receive, via a user interface displayed on touch screen 110, an input to control operations of touch screen manager 130. For example, but not as a limitation, processor 140 may be configured to receive an input to select whether to activate or deactivate functions to change at least one of a display property, a touch sensing property, a size, a position or a contour of the bezel area.

Figure 2:
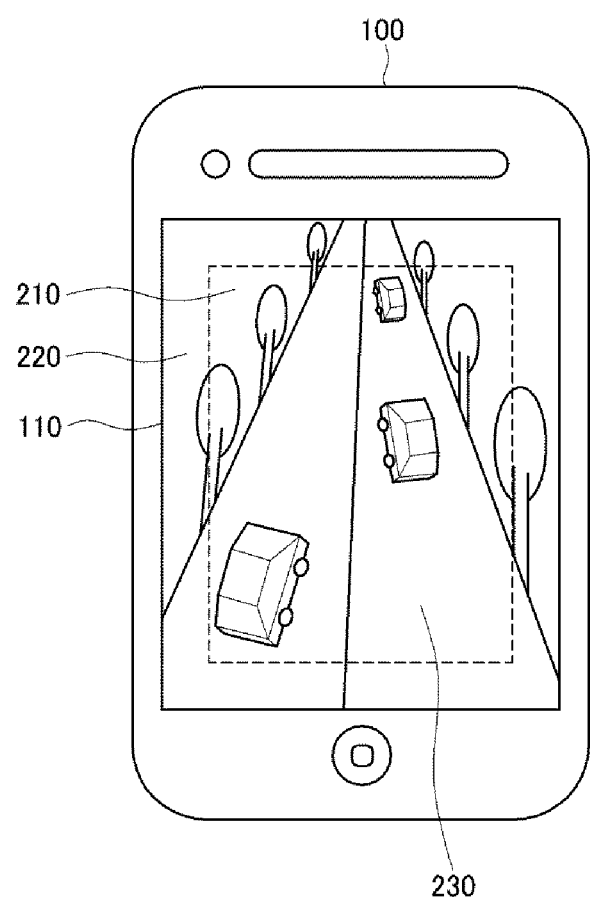
FIG. 2 schematically shows an illustrative example of an end device in accordance with at least some embodiments described herein.

FIG. 2 schematically shows an illustrative example of an end device 100 in accordance with at least some embodiments described herein. End device 100 may be configured to determine a normal area 210 and a bezel area 220 on touch screen 110. As depicted in FIG. 2, end device 100 may be configured to display an image 230 both on normal area 210 and on bezel area 220. Although, in FIG. 2, it seems like that there is no difference between normal area 210 and bezel area 220 except that bezel area 220 surrounds normal area 210, a touch sensing property of normal area 210 may be different from that of bezel area 220. For example, but not as a limitation, a touch sensitivity of bezel area 220 may be lower than a touch sensitivity of normal area 210. Alternatively, touch sensors within normal area 210 may be turned on, while touch sensors within bezel area 220 may be turned off.

Although, in FIG. 2, bezel area 220 is depicted to have a rectangular contour (i.e., a dashed line in FIG. 2), the contour of bezel area 220 may be changed and may have a variety of shapes, such as a circular shape, a star shape, a triangular shape, etc. Further, although, in FIG. 2, bezel area 220 is depicted to surround normal area 210, a size or a position of bezel area 220 may be changed. For example, but not as a limitation, normal area 210 may take possession of a left side half of touch screen 110 and bezel area 220 may take possession of a right side half of touch screen 110. For another example, normal area 210 may take possession of an upper part of touch screen 110 and bezel area 220 may take possession of a remaining lower part of touch screen 110.

Figure 3:
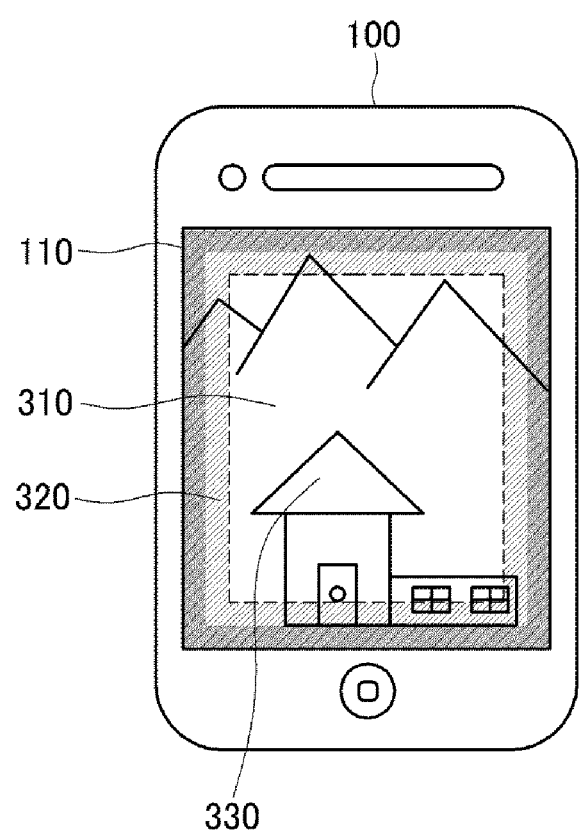
FIG. 3 schematically shows another illustrative example of an end device in accordance with at least some embodiments described herein.

FIG. 3 schematically shows another illustrative example of an end device 100 in accordance with at least some embodiments described herein. End device 100 may be configured to determine a normal area 310 and a bezel area 320 on touch screen 110. As depicted in FIG. 3, end device 100 may be configured to display an image 330 on normal area 310 as well as bezel area 320. Further, end device 100 may be configured to determine a display property of bezel area 320, so the display property of bezel area 320 may be different from that of normal area 310. Non-limiting examples of the display property may include at least one of a brightness, a resolution, a transparency, a visibility or a chroma. For example, but not as a limitation, as depicted in FIG. 3, end device 100 may be configured to decrease at least one of a brightness, a resolution, a transparency, a visibility or a chroma of a part of image 330, which is displayed on bezel area 320, as compared to the other part of image 330, which is displayed on normal area 310. Further, a touch sensitivity of bezel area 320 may be lower than a touch sensitivity of normal area 310. Alternatively, touch sensors corresponding to normal area 310 may be turned on, but, touch sensors corresponding to bezel area 320 may be turned off.

Further, end device 100 may be configured to divide bezel area 320 into multiple sub-areas. End device 100 may be further configured to respectively determine the display property of each of the multiple sub-areas of bezel area 320. For example, but not as a limitation, as depicted in FIG. 3, end device 100 may be configured to divide bezel area 320 into two sub-areas. Further, end device 100 may be configured to determine at least one of a brightness, a resolution, a transparency, a visibility or a chroma of the two sub-areas to be different from each other.

Although, in FIG. 3, bezel area 320 is depicted to have a rectangular contour (i.e., a dashed line in FIG. 3), the contour of bezel area 320 may be changed and may have a variety of shapes, such as a circular shape, a star shape, a triangular shape, etc. Further, although, in FIG. 3, bezel area 320 is depicted to surround normal area 310, a size or a position of bezel area 320 may be changed.

Figure 4:
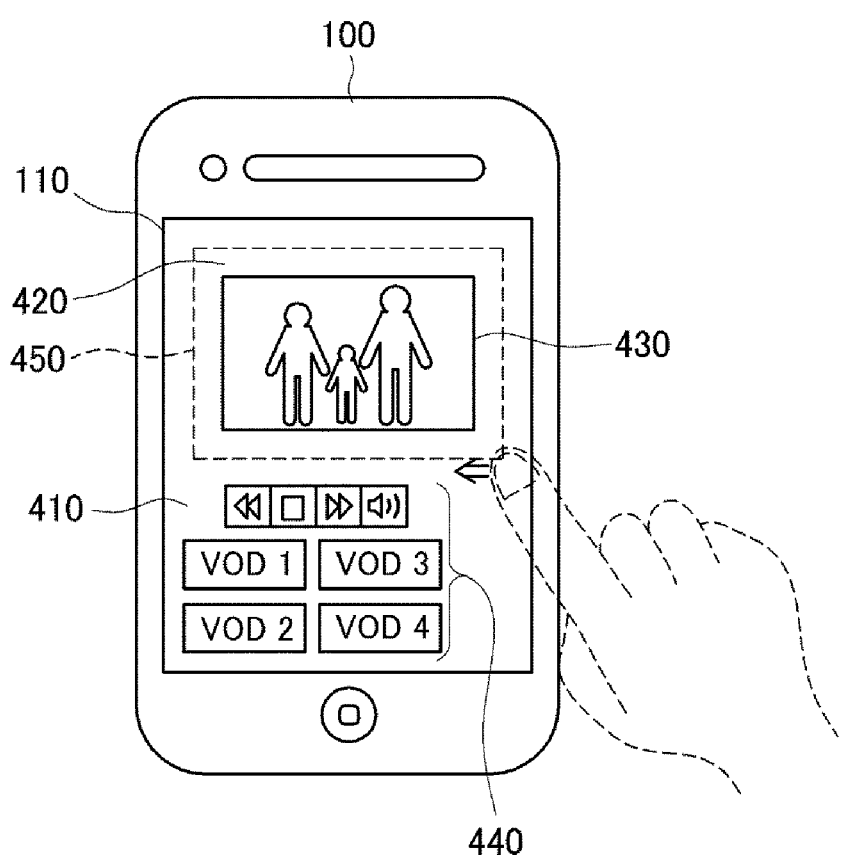
FIG. 4 schematically shows still another illustrative example of an end device in accordance with at least some embodiments described herein.

FIG. 4 schematically shows still another illustrative example of an end device 100 in accordance with at least some embodiments described herein. As depicted in FIG. 4, end device 100 may be configured to determine a normal area 410 and a bezel area 420 on touch screen 110. In some embodiments, end device 100 may be configured to receive a touch input which may be inputted to touch screen 110 by a user of end device 100. Further, end device 100 may be configured to determine a contour 450 of bezel area 420, based, at least in part, on the received touch input and an application which is executed on end device 100.

For example, but not as a limitation, as depicted in FIG. 4, a content displaying part 430 (e.g., a display area on which video content is reproduced) and a control menu part 440 (e.g., a backward icon, a forward icon, a stop icon, a volume icon or video content selecting icon) may be displayed on touch screen 110. Since it is generally desired that content displaying part 430 does not respond to a touch input during the video content is reproduced, a user of end device 100 may generate a touch input that draws a rectangular line (i.e., a dashed line in FIG. 4) which surrounds a boundary of content playing part 430 in order to set up bezel area 420 to include content playing part 430. End device 100 may be configured to receive and identify the touch input. Further, end device 100 may be configured to then determine contour 450 of bezel area 420 and to determine a size and/or a position of bezel area 420 which has a lower touch sensitivity than normal area 410, based at least in part, on the received touch input.

FIGS. 5A to 5D schematically show still another illustrative examples of an end device 100 in accordance with at least some embodiments described herein. End device 100 may be configured to determine a normal area 510, 530, 550 or 570 and a bezel area 520, 540, 560 or 580 on touch screen 110. For the purpose of simplification, although, in FIGS. 5A to 5D, end device 100 is depicted to display no image on touch screen, end device 100 may display an image on normal area 510, 530, 550 or 570 as well as bezel area 520, 540, 560 or 580 on touch screen 110. In some embodiments, a touch sensitivity of bezel areas 520, 540, 560 and 580 may be lower than a touch sensitivity of normal areas 510, 530, 550 and 570. Alternatively, touch sensors corresponding to normal area 510, 530, 550 or 570 may be turned on, but, touch sensors corresponding to bezel areas 520, 540, 560 and 580 may be turned off.

In some embodiments, end device 100 may be configured to determine and/or change a size or a position of a bezel area, based on at least one of a shape of a grip of a user on touch screen 110 or an orientation of end device 100. End device 100 may be configured to include a sensor to sense the orientation of end device 100. Non-limiting examples of the sensor may include a gyro sensor, an acceleration sensor, a geomagnetic sensor, etc. Further, end device 100 may be configured to recognize and identify a shape of a grip, based on an area where a finger or a hand of the user touches. Alternatively, end device 100 may be configured to pre-register and store, in a corresponding memory, information regarding a shape or a direction of a grip of a user of end device 100.

Figure 5A:
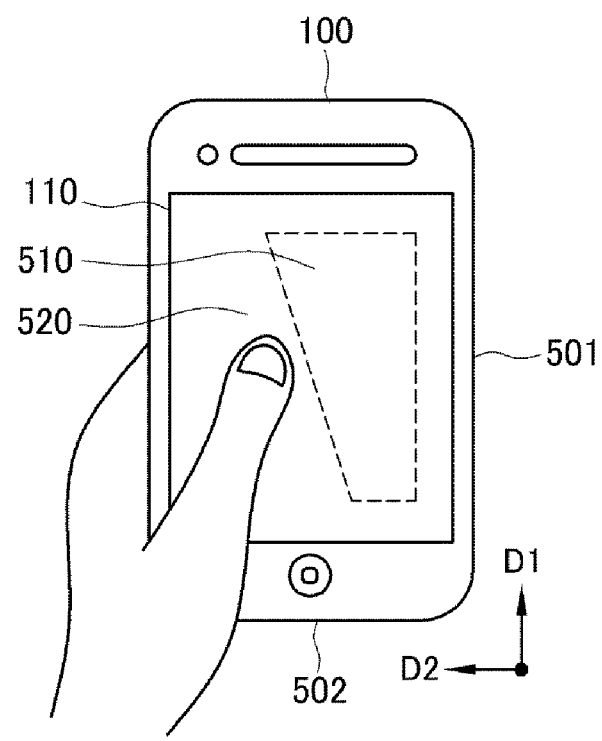
FIGS. 5A to 5D schematically show still another illustrative examples of an end device in accordance with at least some embodiments described herein.

For example, but not as a limitation, end device 100 may be configured to determine shapes or sizes of normal area 510 and bezel area 520 so that normal area 510 has. e.g., a trapezoid shape, as depicted in FIG. 5A, when a user of end device 100 holds end device 100 with a left hand in a vertical orientation (i.e., a vertical side 501 of end device 100 is oriented in a vertical direction D1).

Figure 5B:
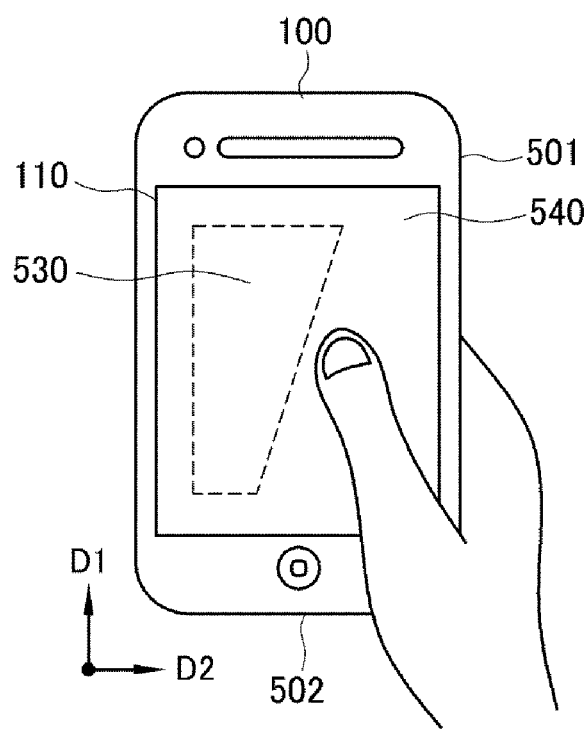

For another example, end device 100 may be configured to determine shapes or sizes of normal area 530 and bezel area 540 so that normal area 530 has e.g., a trapezoid shape, as depicted in FIG. 5B, when a user of end device 100 holds end device 100 with a right hand in a vertical orientation (i.e., vertical side 501 of end device 100 is oriented in vertical direction D1).

Figure 5C:
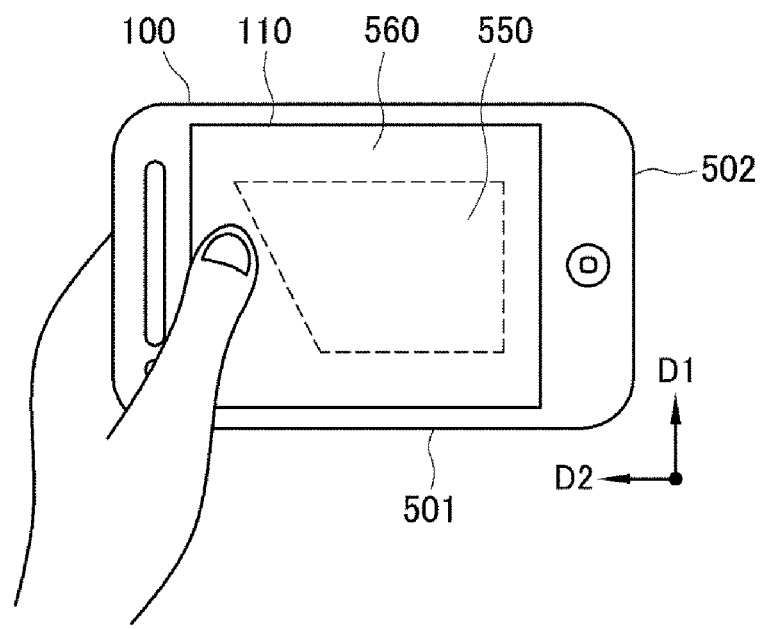

For another example, end device 100 may be configured to determine shapes or sizes of normal area 550 and bezel area 560 so that normal area 550 has e.g., a trapezoid shape, as depicted in FIG. 5C, when a user of end device 100 holds end device 100 with a left hand in a horizontal orientation (i.e., a horizontal side 502 of end device 100 is oriented in vertical direction D1).

Figure 5D:
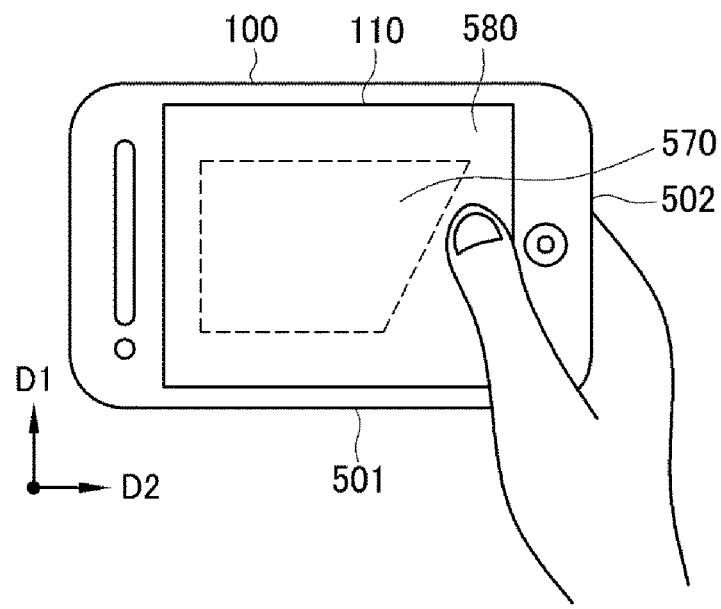

For another example, end device 100 may be configured to determine shapes or sizes of normal area 570 and bezel area 580 so that normal area 570 has e.g., a trapezoid shape, as depicted in FIG. 5D, when a user of end device 100 holds end device 100 with a right hand in a horizontal orientation (i.e., vertical edge 501 of end device 100 is oriented in a horizontal direction D2). Although, in FIGS. 5A to 5D, normal area 510, 530, 550 or 570 are depicted to have a trapezoid shape, a shape or size of normal area 510, 530, 550 or 570 may be changed.

Figure 6:
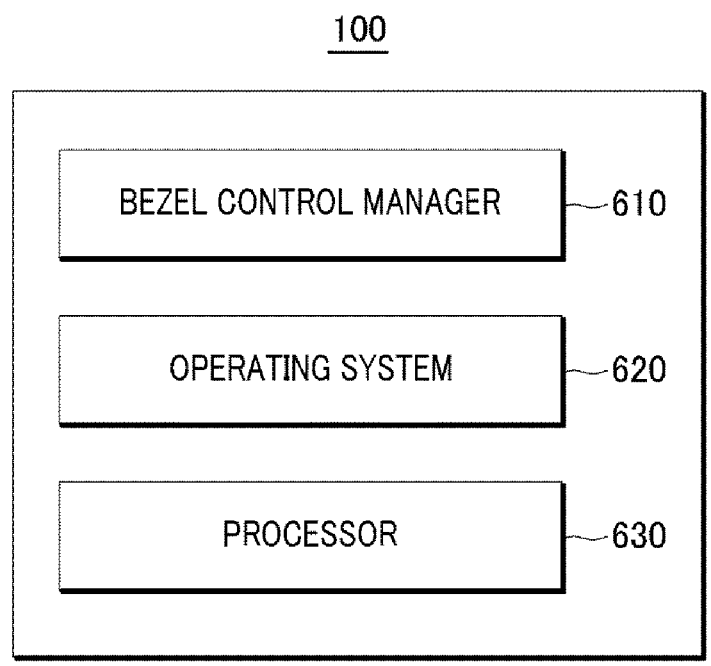
FIG. 6 schematically shows another example configuration of an end device in accordance with at least some embodiments described herein.

FIG. 6 schematically shows another example configuration of an end device 100 in accordance with at least some embodiments described herein. As depicted in FIG. 6, end device 100 may include a bezel control manager 610, an operating system 620 and a processor 630. Although illustrated as discrete components, various components may be divided into additional components, combined into fewer components, or eliminated altogether while being contemplated within the scope of the disclosed subject matter. It will be understood by those skilled in the art that each function and/or operation of the components may be implemented, individually and/or collectively, by a wide range of hardware, software, firmware, or virtually any combination thereof. In some embodiments, bezel control manager 610 may be an application adapted to operate on operating system 620 such that a bezel displayed on a touch screen as described herein may be provided. Operating system 620 may allow bezel control manager 610 to manipulate processor 630 to implement the bezel displayed on a touch screen as described herein.

Processor 630 may be implemented as any processor, such as a complex instruction set computer (CISC) microprocessor, a reduced instruction set computing (RISC) microprocessor, a very long instruction word (VLIW) microprocessor, a processor implementing a combination of instruction sets, or other processor device. Processor 630 may be implemented as a dedicated processor, such as a controller, microcontroller, embedded processor, a digital signal processor (DSP), a network processor, a media processor, an input/output (I/O) processor, etc.

Figure 7:
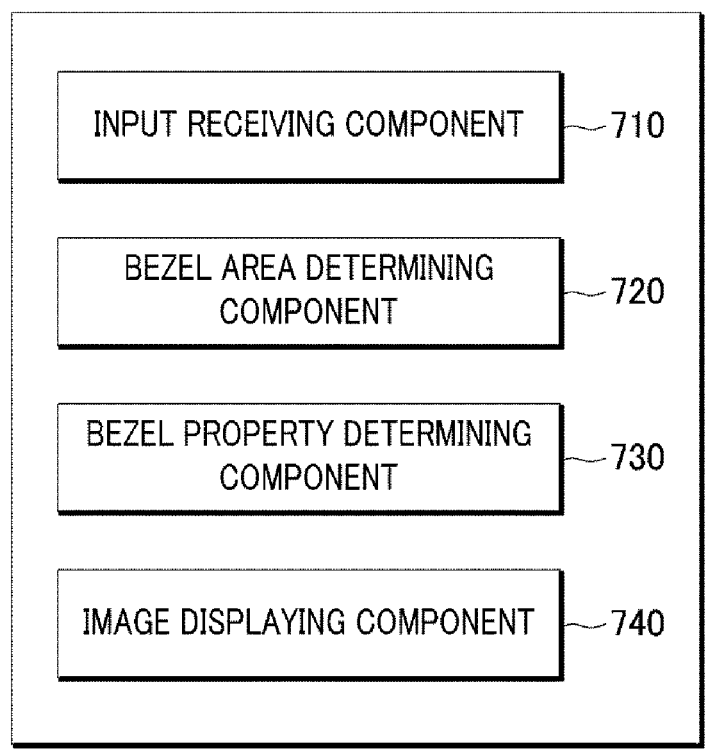
FIG. 7 schematically shows an example configuration of a bezel control manager in accordance with at least some embodiments described herein.

FIG. 7 schematically shows an example configuration of a bezel control manager 610 in accordance with at least some embodiments described herein. As depicted in FIG. 7, bezel control manager 610 may include an input receiving component 710, a bezel area determining component 720, a bezel property determining component 730 and an image displaying component 740. Although illustrated as discrete components, various components may be divided into additional components, combined into fewer components, or eliminated altogether while being contemplated within the scope of the disclosed subject matter. It will be understood by those skilled in the art that each function and/or operation of the components may be implemented, individually and/or collectively, by a wide range of hardware, software, firmware, or virtually any combination thereof.

Input receiving component 710 may be configured to receive and/or identify a touch input that may be generated by a user of end device 100 on touch screen 110. The user may make the touch input to touch screen 110 using any suitable object or appendage, such as a stylus, finger, and so forth.

Bezel area determining unit 720 may be configured to determine a bezel area and a normal area on touch screen 110. Bezel area determining unit 720 may be configured to determine sizes and/or positions of the bezel area and the normal area on touch screen 110, and to determine the bezel area and the normal area based on the determined sizes and/or positions. In some embodiments, bezel area determining unit 720 may be configured to determine a size and/or position of the bezel area, based on context information of end device 100. Non-limiting examples of the context information of end device 100 may include at least one of a status of a battery coupled to end device 100, a shape of a grip of a user on touch screen 110, an orientation of end device 100 or an application hosted on end device 100.

In some embodiments, bezel area determining unit 720 may be configured to determine a contour of the bezel area, based, at least in part, on the touch input which is received by input receiving component 710. For example, but not as a limitation, bezel area determining unit 720 may be configured to recognize a circular line which is drawn by a touch input that draws a circle on touch screen 110. Bezel area determining unit 720 may be configured to then change the contour of the bezel area (e.g., a boundary line between the bezel area and the normal area) into the recognized circular line.

Bezel property determining component 730 may be configured to determine a display property of the bezel area. For example, but not as a limitation, the display property of the bezel area may refer to at least one of a brightness, a resolution, a transparency, a visibility or a chroma of the bezel area. In some embodiments, bezel property determining component 730 may be configured to determine the display property of the bezel area based, at least in part, on the context information of end device 100. For example, bezel property determining component 730 may be configured to change a resolution of an image displayed on the bezel area, depending on a status of a battery coupled to end device 100.

Bezel property determining component 730 may be further configured to determine a touch sensing property of the bezel area. For example, but not as a limitation, the touch sensing property of the bezel area may include at least one of a touch sensitivity of the bezel area, or turn on/off of touch sensors of the bezel area. In some embodiments, bezel property determining component 730 may be configured to determine the touch sensing property of the bezel area based, at least in part, on the context information of end device 100. For example, bezel property determining component 730 may be configured to increase the touch sensitivity of the bezel area, if an application which may need a relatively high touch sensitivity (e.g., a game application) is executed on end device 100. On the contrary, bezel property determining component 730 may be configured to decrease the touch sensitivity of the bezel area, if an application which may need a relatively low touch sensitivity (e.g., a web browser) is executed on end device 100.

Image displaying component 740 may be configured to display an image on the bezel area and the normal area of touch screen 110. As a non-limiting example of the image displayed on the bezel area and the normal area may include a picture, a frame or a scene of video content, etc.

Figure 8:
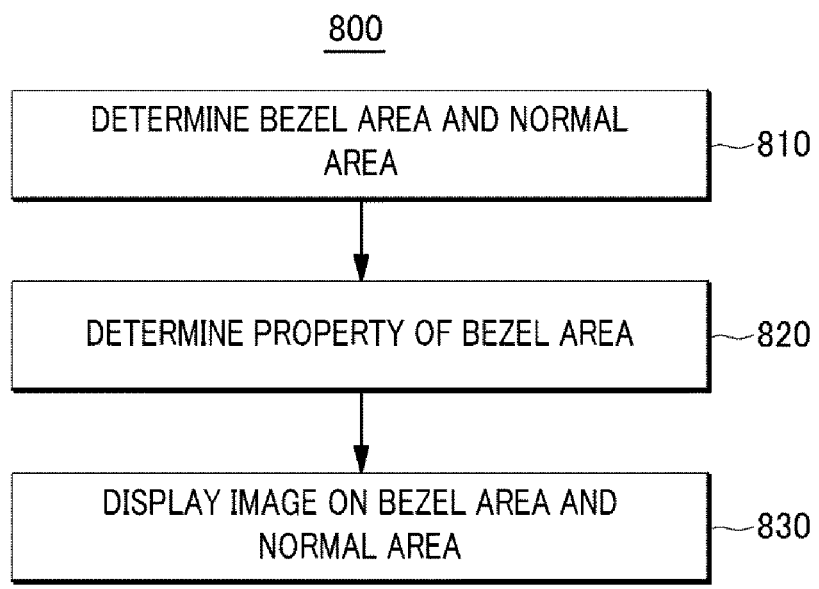
FIG. 8 shows an example processing flow for implementing at least portions of a bezel area on a touch screen described herein.

FIG. 8 shows an example processing flow 800 for implementing at least portions of a bezel area on a touch screen described herein. The process in FIG. 8 may be implemented by end device 100 including touch screen 110, input receiver 120, touch screen manager 130 and processor 140, as illustrated in FIG. 1. An example process may include one or more operations, actions, or functions as illustrated by one or more blocks 810, 820 and/or 830. Although illustrated as discrete blocks, various blocks may be divided into additional blocks, combined into fewer blocks, or eliminated, depending on the desired implementation. Processing may begin at block 810.

At block 810 (Determine Bezel Area and Normal Area), touch screen manager 130 may determine a bezel area and a normal area on touch screen 110. At block 810, touch screen manager 130 may determine sizes and/or positions of the bezel area and the normal area on touch screen 110, and determine the bezel area and the normal area based on the determined sized and/or positions. Processing may proceed from block 810 to block 820.

At block 820 (Determine Property of Bezel Area), touch screen manager 130 may determine at least one of a display property or a touch sensing property of the bezel area determined at block 810. Touch screen manager 130 may determine the display property or the touch sensing property of the bezel area to be different from that of the normal area. For example, but not as a limitation, the display property of the bezel area may refer to at least one of a brightness, a resolution, a transparency, a visibility or a chroma of the bezel area. For example, touch screen manager 130 may reduce brightness of the bezel area to be less than that of the normal area. Further, for example, but not as a limitation, the touch sensing property of the bezel area may include at least one of a touch sensitivity of the bezel area, or turn on/off of touch sensors of the bezel area. For example, touch screen manager 130 may turn off touch sensors of the bezel area and turn on touch sensors of the normal area.

In some embodiments, touch screen manager 130 may determine the display property or the touch sensing property of the bezel area based, at least in part, on context information of end device 100. Non-limiting examples of the context information of end device 100 may include at least one of a status of a battery coupled to end device 100, a shape of a grip of a user on touch screen 110, an orientation of end device 100 or an application hosted on end device 100. Processing may proceed from block 820 to block 830.

At block 830 (Display Image on Bezel Area and Normal Area), processor 140 may display an image on the normal area and the bezel area that has the determined display property and/or touch sensing property. As a non-limiting example of the image displayed on the bezel area and the normal area may include a picture, a frame or a scene of video content, etc.

Figure 9:
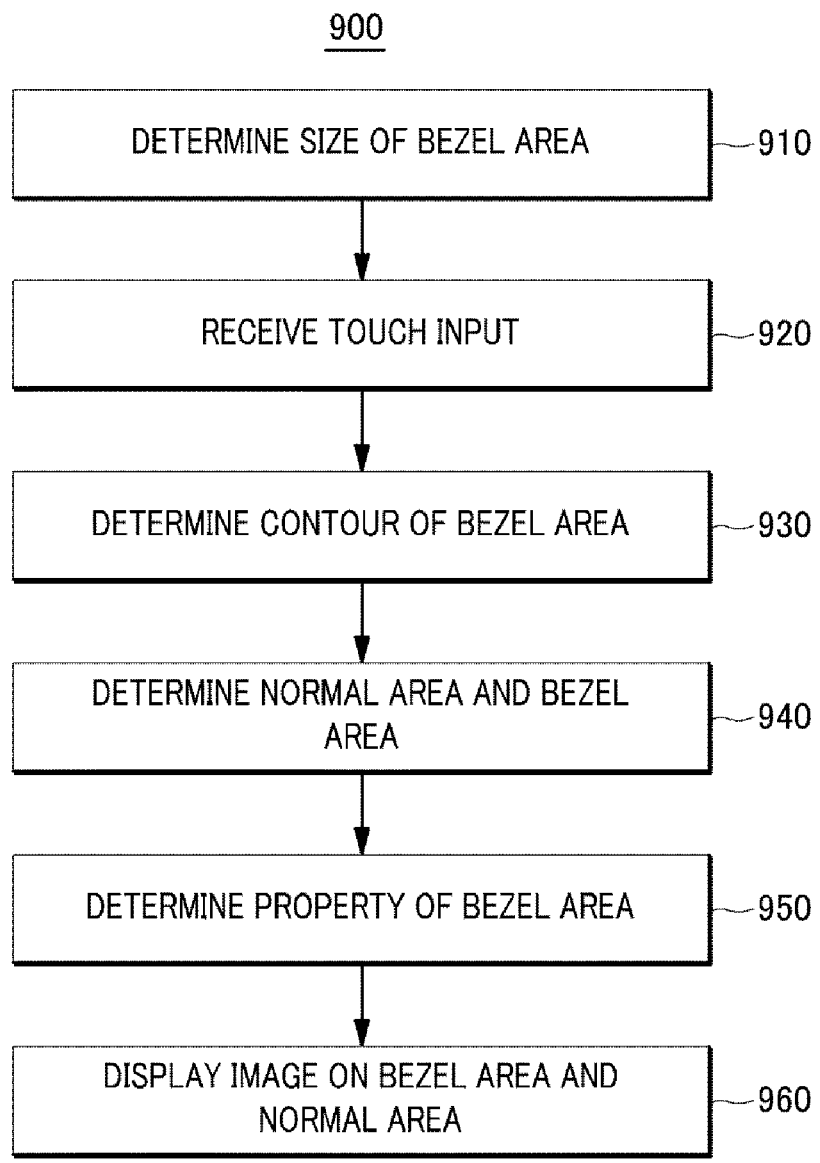
FIG. 9 shows another example processing flow for implementing at least portions of a bezel area on a touch screen described herein.

FIG. 9 shows another example processing flow 900 for implementing at least portions of a bezel area on a touch screen described herein. The process in FIG. 9 may be implemented by end device 100 including touch screen 110, input receiver 120, touch screen manager 130 and processor 140, as illustrated in FIG. 1. An example process may include one or more operations, actions, or functions as illustrated by one or more blocks 910, 920, 930, 940, 950 and/or 960. Although illustrated as discrete blocks, various blocks may be divided into additional blocks, combined into fewer blocks, or eliminated, depending on the desired implementation. Processing may begin at block 910.

At block 910 (Determine Size of Bezel Area), touch screen manager 130 may determine a size and/or a position of a bezel area on touch screen 110 based, at least in part, on context information of end device 100. Non-limiting examples of the context information of end device 100 may include at least one of a status of a battery coupled to end device 100, a shape of a grip of a user on touch screen 110, an orientation of end device 100 or an application hosted on end device 100. Processing may proceed from block 910 to block 920.

At block 920 (Receive Touch Input), input receiver 120 may receive and/or identify a touch input that may be generated by a user of end device 100 on touch screen 110. For example, input receiver 120 may identify a touch input that draws a circle on touch screen 110. Processing may proceed from block 920 to block 930.

At block 930 (Determine Contour of Bezel Area), touch screen manager 130 may determine a contour of the bezel area, based, at least in part, on the touch input received at block 920. As for the above example, touch screen manager 130 may change the contour of the bezel area into a circular line that is drawn by the touch input received at block 920. Processing may proceed from block 930 to block 940.

At block 940 (Determine Normal Area and Bezel Area), touch screen manager 130 may determine a normal area and the bezel area on touch screen 110, based on information regarding the size of the bezel area, which is determined at block 910 and the contour of the bezel area, which is determined at block 930. Processing may proceed from block 940 to block 950.

At block 950 (Determine Property of Bezel Area), touch screen manager 130 may determine at least one of a display property or a touch sensing property of the bezel area determined at block 940. Touch screen manager 130 may determine the display property or the touch sensing property of the bezel area to be different from that of the normal area. For example, but not as a limitation, the display property of the bezel area may refer to at least one of a brightness, a resolution, a transparency, a visibility or a chroma of the bezel area. Further, for example, but not as a limitation, the touch sensing property of the bezel area may include at least one of a touch sensitivity of the bezel area, or turn on/off of touch sensors of the bezel area. In some embodiments, at block 950, touch screen manager 130 may determine the display property or the touch sensing property of the bezel area, based on the context information of end device 100. For example, touch screen manager 130 may reduce brightness of the bezel area to be less than that of the normal area or may turn off touch sensors of the bezel area, if an amount of power charged in a battery of end device 100 remains lower than a predetermined threshold value. Processing may proceed from block 950 to block 960.

At block 960 (Display Image on Bezel Area and Normal Area), processor 140 may display an image on the normal area and the bezel area that has the determined display property and/or touch sensing property. As a non-limiting example of the image displayed on the bezel area and the normal area may include a picture, a frame or a scene of video content, etc.

The examples described above, with regard to FIGS. 1-9, may be implemented in a computing environment having components that include, but are not limited to, one or more processors, system memory, and a system bus that couples various system components. Further, the computing environment may include a variety of computer readable media that are accessible by any of the various components, and includes both volatile and non-volatile media, removable and non-removable media.

Various modules and techniques may be described herein in the general context of computer-executable instructions, such as program modules, executed by one or more computers or other devices. Generally, program modules include routines, programs, objects, components, data structures, etc. for performing particular tasks or implement particular abstract data types. Typically, the functionality of the program modules may be combined or distributed as desired in various embodiments.

An implementation of these modules and techniques may be stored on or transmitted across some form of computer readable media. Computer readable media can be any available media that can be accessed by a computer. By way of example, but not limitation, computer readable media may comprise computer storage media and communications media.

Computer storage media includes volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

Communication media typically embodies computer readable instructions, data structures, program modules, or other data in a modulated data signal, such as carrier wave or other transport mechanism. Communication media also includes any information delivery media. The term modulated data signal means a signal that has one or more of its characteristics set or changed in such a manner as to encode information in the signal. As a non-limiting example only, communication media includes wired media such as a wired network or direct-wired connection, and wireless media such as acoustic, RF, infrared, and other wireless media. Combinations of any of the above are also included within the scope of computer readable media.

Reference has been made throughout this specification to "one embodiment," "an embodiment," or "an example embodiment" meaning that a particular described feature, structure, or characteristic is included in at least one embodiment of the present invention. Thus, usage of such phrases may refer to more than just one embodiment. Furthermore, the described features, structures, or characteristics may be combined in any suitable manner in one or more embodiments.

While example embodiments and applications of the present invention have been illustrated and described, it is to be understood that the invention is not limited to the precise configuration and resources described above. Various modifications, changes, and variations apparent to those skilled in the art may be made in the arrangement, operation, and details of the methods and systems of the present invention disclosed herein without departing from the scope of the claimed invention.

One skilled in the relevant art may recognize, however, that the invention may be practiced without one or more of the specific details, or with other methods, resources, materials, etc. In other instances, well known structures, resources, or operations have not been shown or described in detail merely to avoid obscuring aspects of the invention.

What is claimed is:

1. An end device, comprising:
   a touch screen;
   a touch screen manager configured to:
      determine a first area and a second area on the touch screen, and
      determine at least one of a display property or a touch sensing property of the first area to be different from that of the second area; and
   a processor configured to:
      display an image on the first area and the second area, wherein the touch screen manager is further configured to determine a size and/or a position of the first area, based at least in part on context information of the end device, and
   the context information includes a status of a battery coupled to the end device.

2. The end device of claim 1, further comprising:
   an input receiver configured to receive a touch input, and
   wherein the touch screen manager is further configured to determine a contour of the first area, based at least in part on the received touch input.

3. The end device of claim 1, wherein the context information further includes at least one of a shape of a grip of a user on the touch screen, an orientation of the end device or an application hosted on the end device.

4. The end device of claim 1, wherein the touch sensing property includes at least one of a touch sensitivity of the first area, or turn on/off of touch sensors of the first area.

5. The end device of claim 1, wherein the display property includes at least one of a brightness, a resolution, a transparency, a visibility or a chroma of the first area.

6. The end device of claim 1, wherein the touch screen manager is further configured to:
   divide the first area into a plurality of sub-areas, and
   respectively determine the display property of each of the plurality of sub-areas.

7. A non-transitory computer-readable storage medium having thereon computer-executable instructions that, in response to execution, cause one or more processors of an end device having a touch screen to perform operations, comprising:
   determining a first area and a second area on the touch screen;
   determining at least one of a display property or a touch sensing property of the first area to be different from that of the second area; and
   displaying an image on the first area and the second area, wherein the determining of the first area and the second area comprises determining a size and/or a position of the first area based at least in part on context information of the end device, and
   the context information includes a status of a battery coupled to the end device.

8. The non-transitory computer-readable storage medium of claim 7, wherein the operations further comprises:
   receiving a touch input; and
   determining a contour of the first area, based at least in part on the received touch input.

9. The non-transitory computer-readable storage medium of claim 7, wherein the context information further includes at least one of a shape of a grip of a user on the touch screen, an orientation of the end device or an application hosted on the end device.

10. The non-transitory computer-readable storage medium of claim 7, wherein the touch sensing property includes at least one of a touch sensitivity of the first area, or turn on/off of touch sensors of the first area.

11. The non-transitory computer-readable storage medium of claim 7, wherein the display property includes at least one of a brightness, a resolution, a transparency, a visibility or a chroma of the first area.

12. The non-transitory computer-readable storage medium of claim 7, wherein the determining of the display property of the first area includes:
   dividing the first area into a plurality of sub-areas, and
   respectively determining the display property of each of the plurality of sub-areas.

13. A method performed under control of an end device having a touch screen, comprising:
- determining a first area and a second area on the touch screen;
- determining at least one of a display property or a touch sensing property of the first area to be different from that of the second area; and
- displaying an image on the first area and the second area,
- wherein the determining of the first area and the second area comprises determining a size and/or a position of the first area based at least in part on context information of the end device, and
- the context information includes a status of a battery coupled to the end device.

14. The method of claim 13, further comprising:
receiving a touch input; and
determining a contour of the first area, based at least in part on the received touch input.

15. The method of claim 13, wherein the context information further includes at least one of a shape of a grip of a user on the touch screen, an orientation of the end device or an application hosted on the end device.

16. The method of claim 13, wherein the touch sensing property includes at least one of a touch sensitivity of the first area, or turn on/off of touch sensors of the first area.

17. The method of claim 13, wherein the display property includes at least one of a brightness, a resolution, a transparency, a visibility or a chroma of the first area.

\* \* \* \* \*